United States Patent
Oram et al.

(10) Patent No.: US 9,649,933 B2
(45) Date of Patent: May 16, 2017

(54) VEHICLE POWER TRANSFER UNIT (PTU) DISCONNECT ASSEMBLY

(71) Applicant: GKN Driveline North America, Inc., Auburn Hills, MI (US)

(72) Inventors: Samuel J. Oram, Rochester Hills, MI (US); Tony N. Arden, Davisburg, MI (US); Daniel S. Engerer, West Bloomfield, MI (US); Austin R. Gerding, Shelby Township, MI (US); Robert E. Toaso, Livonia, MI (US); Rick Ohsiek, Sterling Heights, MI (US)

(73) Assignee: GKN DRIVELINE NORTH AMERICA, INC., Auburn, MI (US)

( * ) Notice: Subject to any disclaimer, the term of this patent is extended or adjusted under 35 U.S.C. 154(b) by 137 days.

(21) Appl. No.: 14/707,534

(22) Filed: May 8, 2015

(65) Prior Publication Data
US 2015/0321554 A1    Nov. 12, 2015

Related U.S. Application Data

(60) Provisional application No. 61/990,315, filed on May 8, 2014.

(51) Int. Cl.
| F16D 11/14 | (2006.01) |
| F16D 23/12 | (2006.01) |
| B60K 17/344 | (2006.01) |
| B60K 23/08 | (2006.01) |
| F16D 1/116 | (2006.01) |
| F16D 11/00 | (2006.01) |
| B60K 17/35 | (2006.01) |
| F16D 1/10 | (2006.01) |

(52) U.S. Cl.
CPC .............. *B60K 23/08* (2013.01); *F16D 1/116* (2013.01); *F16D 11/14* (2013.01); *B60K 17/344* (2013.01); *B60K 17/35* (2013.01); *F16D 2001/103* (2013.01); *F16D 2011/002* (2013.01); *F16D 2023/123* (2013.01); *F16D 2300/22* (2013.01)

(58) Field of Classification Search
CPC .............. F16D 2011/002; F16D 11/14; F16D 2023/123; F16D 2300/22; B60K 17/344; B60K 17/35; B60K 23/08
USPC ............................................ 192/69.9, 109 R
See application file for complete search history.

(56) References Cited

U.S. PATENT DOCUMENTS

| 3,348,645 A | 10/1967 | Sigg et al. |
| 3,753,479 A | 8/1973 | Williams |
| 4,604,908 A | 8/1986 | Dolan |
| 4,811,824 A | 3/1989 | Kurihara |

(Continued)

FOREIGN PATENT DOCUMENTS

| DE | 102012210287 A1 | 12/2013 |
| WO | WO2012145580 A1 | 10/2012 |
| WO | WO2014172274 A1 | 10/2014 |

*Primary Examiner* — Richard Lorence
(74) *Attorney, Agent, or Firm* — Jennifer M. Brumbaugh; Reising Ethington P.C.

(57) ABSTRACT

A vehicle power transfer unit (PTU) disconnect assembly can include a first shaft, a second shaft, and a collar assembly. The first shaft has a first split-spline at its exterior surface. The second shaft is telescoped over the first shaft and has a set of splines at its exterior surface. A helical gear is carried by the second shaft. The collar assembly is situated around both of the first and second shafts. The collar assembly has a second split-spline at its interior surface.

21 Claims, 7 Drawing Sheets

(56) References Cited

U.S. PATENT DOCUMENTS

| | | |
|---|---|---|
| 4,836,053 A | 6/1989 | Eastman et al. |
| 4,862,755 A | 9/1989 | Eastman et al. |
| 5,099,704 A | 3/1992 | Williams et al. |
| 5,106,351 A | 4/1992 | Williams et al. |
| 5,170,674 A | 12/1992 | Williams et al. |
| 5,394,967 A | 3/1995 | Bigley et al. |
| 5,465,819 A | 11/1995 | Weilant |
| 5,520,272 A | 5/1996 | Ewer et al. |
| 5,597,058 A | 1/1997 | Ewer |
| 5,908,080 A | 6/1999 | Bigley et al. |
| 5,996,719 A | 12/1999 | Galli |
| 6,422,369 B1 | 7/2002 | McCalla |
| 7,000,750 B2 | 2/2006 | Ewer |
| 7,143,883 B2 * | 12/2006 | McCalla ................ F16D 11/10 192/109 R |
| 2001/0011622 A1 | 8/2001 | Arai et al. |
| 2005/0279601 A1 | 12/2005 | Tuday |
| 2007/0095628 A1 | 5/2007 | Niederbacher |
| 2010/0089685 A1 | 4/2010 | Quehenberger et al. |
| 2010/0122884 A1 | 5/2010 | Mizon et al. |
| 2010/0200352 A1 | 8/2010 | Williams |
| 2013/0334000 A1 | 12/2013 | Gerauer et al. |
| 2015/0107954 A1 * | 4/2015 | Baur ...................... F16D 11/14 192/69 |
| 2016/0061274 A1 * | 3/2016 | Engerer ................. F16D 11/14 192/35 |

\* cited by examiner

VEHICLE POWER TRANSFER UNIT (PTU) DISCONNECT ASSEMBLY

REFERENCE TO CO-PENDING APPLICATION

This application claims the benefit of U.S. Provisional Patent Application Ser. No. 61/990,315 filed May 8, 2014, which is incorporated herein by reference in its entirety.

TECHNICAL FIELD

The present disclosure relates generally to vehicle power transfer units (PTUs), and more particularly to assemblies for connecting and disconnecting transmitted rotation in PTUs.

BACKGROUND

In general, vehicle drivelines transmit torque from a vehicle's engine to its wheels. Automotive drivelines sometimes include power transfer units (PTUs) for selectively distributing torque among shafts in the drivelines. The PTUs are often equipped in four-wheel drive and all-wheel drive (AWD) automotive driveline configurations. A power transfer unit typically consists of a housing that encloses and supports gears, shafts, bearings, as well as other components.

Sometimes PTUs are capable of disconnecting and re-connecting its components. The disconnected components are no longer driven to rotate and no longer transmit torque between them. These capabilities, along with other disconnected components in automotive drivelines, can preclude driven rotations in portions of the drivelines not needed to transmit torque at a particular time. For instance, on-demand AWD automotive driveline configurations do not always transmit torque among all of its shafts. Increased fuel mileage, reduced emissions, and other performance improvements often result.

SUMMARY

In one implementation, a vehicle power transfer unit (PTU) disconnect assembly may include a first shaft, a second shaft, and a collar. The first shaft may have a first set of splines, a second set of splines, and a first non-splined section separating the first and second sets of splines. The second shaft may have a third set of splines. The collar may have a fourth set of splines, a fifth set of splines, and a second non-splined section separating the fourth and fifth sets of splines. In a first shifted position of the collar, the first set of splines may be mated with the fourth set of splines, and the second set of splines and third set of splines may be mated with the fifth set of splines. In the first shifted position, the vehicle PTU disconnect assembly may be in a connected state in which rotation is transmitted from the first shaft and to the second shaft. In a second shifted position of the collar, the fourth set of splines may be situated at the first non-splined section, and the second set of splines may be situated at the second non-splined section. In the second shifted position, the vehicle PTU disconnect assembly may be in a disconnected state in which rotation is not transmitted from the first shaft and to the second shaft.

In another implementation, a vehicle power transfer unit (PTU) disconnect assembly may include a first shaft, a second shaft, a collar assembly, and an actuator assembly. The first shaft may have a first split-spline at an exterior surface of the first shaft. The second shaft may be situated partly or more around the first shaft. The second shaft may have a set of splines at an exterior surface of the second shaft. The second shaft may carry a helical gear at a location spaced away from the set of splines. The collar assembly may be situated partly around the first shaft and partly around the second shaft. The collar assembly may include a cage, a collar, and a secondary spring. The collar and secondary spring may be held by the cage. The collar may have a second split-spline at an interior surface of the collar. The actuator assembly may engage the collar assembly in order to move the collar assembly from a first shifted position to a second shifted position. In the first shifted position, the first split-spline may be mated with the second split-spline, and the second split-spline may be mated with the set of splines. In the second shifted position, the first split-spline may be unmated with the second split-spline. If a torque-lock condition is being experienced when the actuator assembly engages the collar assembly, the secondary spring yields and the cage may be capable of moving relative to the collar.

In yet another implementation, a vehicle power transfer unit (PTU) disconnect assembly may include a first shaft, a second shaft, a collar, and a cam assembly. The first shaft may have a first split-spline located at an exterior surface of the first shaft. The second shaft may have a set of splines located at an exterior surface of the second shaft. The collar may have a second split-spline located at an interior surface of the collar. The cam assembly may include a rotary cam and a cam follower. Upon activation, rotation of the rotary cam may cause linear movement of the cam follower. The cam follower may engage the collar in order to move the collar from a first shifted position to a second shifted position. In the first shifted position, the first split-spline may be mated with the second split-spline, and the second split-spline may be mated with the set of splines. And in the second shifted position, the first split-spline may be unmated with the second split-spline.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Referring in more detail to the drawings, a vehicle power transfer unit (PTU) disconnect assembly 10 disconnects shafts to preclude transmitted rotation between the shafts, and re-connects the shafts to permit transmitted rotation therebetween. The vehicle PTU disconnect assembly 10, and its accompanying power transfer unit (PTU) 12, can be part of a larger disconnect system equipped in an automotive driveline. The disconnect system discontinues the driven rotation of certain components, such as driveline shafts and gears, when the components are not needed to transmit torque in the automotive driveline. A split-spline design and construction in the vehicle PTU disconnect assembly 10 reduces a disconnect and re-connect shift distance—in some instances by as much as one-half compared to known shift distances. This reduces the time it takes to disconnect and re-connect, and results in a reduced force required to carry out shifting. Other performance enhancements and improvements are possible. As an aside, the terms axially, radially, circumferentially, and their related forms, as used in this description are with respect to the generally circular and cylindrical components of the PTU 12, unless specified otherwise.

Figure 1:
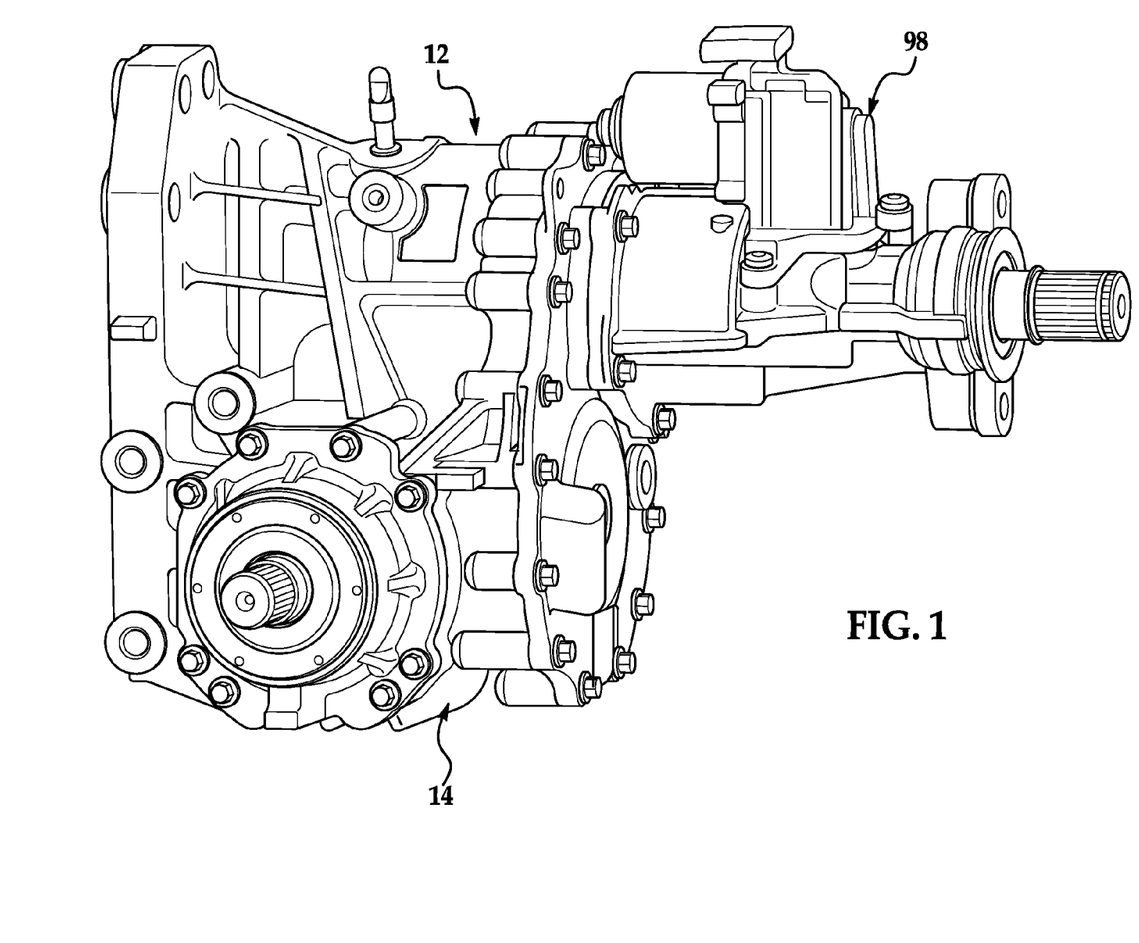
FIG. 1 is a perspective view of an embodiment of a vehicle power transfer unit (PTU)
Figure 2:
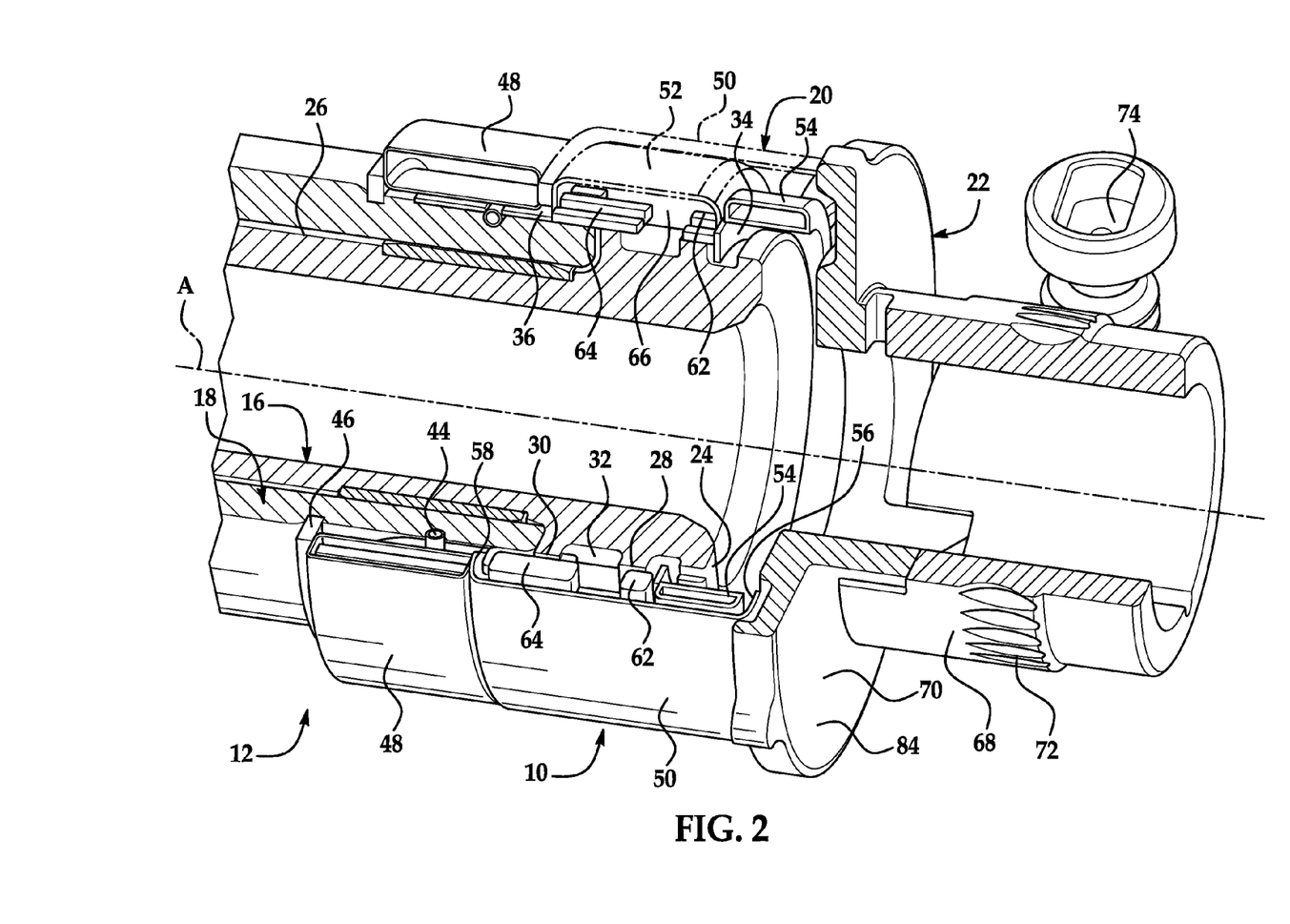
FIG. 2 is a sectioned view of an embodiment of a vehicle PTU disconnect assembly.

Referring to FIGS. 1 and 2, the vehicle PTU disconnect assembly 10 is installed in the PTU 12. The PTU disconnect assembly 10 and PTU 12 can have different designs, constructions, and components depending upon—among other influences—the configuration of the automotive driveline, the architecture of the immediately surrounding automotive components (e.g., engine, transmission, propeller shaft), and packaging and performance demands. In the embodiment here, the PTU 12 includes a housing 14, a first shaft 16, a second shaft 18, a collar assembly 20, and a cam assembly 22. Other PTU components may include a helical gear 23 (depicted schematically in FIG. 4 and sometimes referred to as a ring gear), an output gear, bearings, bushings, seals, and yet additional shafts and gears. The housing 14 encloses and supports interior components of the PTU 12.

Figure 3:
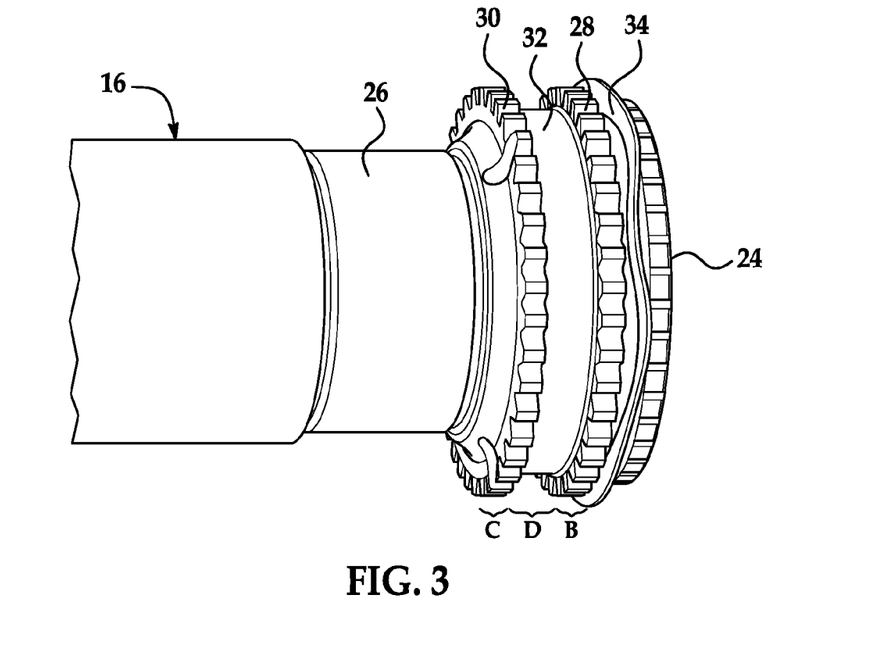
FIG. 3 is a side view of an embodiment of a first shaft used with the vehicle PTU disconnect assembly of FIG. 2.

The first shaft 16 can be interconnected to, and thus driven by, an upstream driveline component such as a differential shaft or gear. In this sense, the first shaft 16 can serve as an input shaft. The first shaft 16 is a hollow metal tube in this embodiment, and rotates about an axis A when the PTU 12 is in use. Referring now to FIGS. 2 and 3, near a terminal end 24 and at an exterior surface 26, the first shaft 16 has a first set of splines 28, a second set of splines 30, and a non-splined section 32 (referred to as the first non-splined section in the assembly) separating the first and second sets of splines.

In the embodiment here, the first set of splines 28 is arranged circumferentially continuously around the first shaft 16, and is located closer to the terminal end 24 than the second set of splines 30. The first set of splines 28 projects radially outboard relative to the exterior surface 26, and has a first axial length B. The second set of splines 30 is spaced axially from the first set of splines 28 via the first non-splined section 32. Like the first set, the second set of splines 30 is arranged circumferentially continuously around the first shaft 16. The second set of splines 30 has a second axial length C that is substantially equal to the first axial length B, though need not be. The first non-splined section 32 spans axially between the first and second sets of splines 28, 30. With respect to its neighboring sets of splines, the first non-splined section 32 presents a circumferential space that lacks formations and is set radially inboard of at least a portion of the sets of splines. The first non-splined section 32 has a third axial length D that is greater than both the first and second axial lengths B, C, but again need not be. Together, the first and second sets of splines 28, 30 and the first non-splined section 32 constitute a split-spline. Furthermore, the first shaft 16 can carry a dampener 34 between its terminal end 24 and the first set of splines 28. The dampener 34 can be a wave spring as shown in FIGS. 2 and 3, could be a helical spring, or could be another type of dampener.

Figure 4:
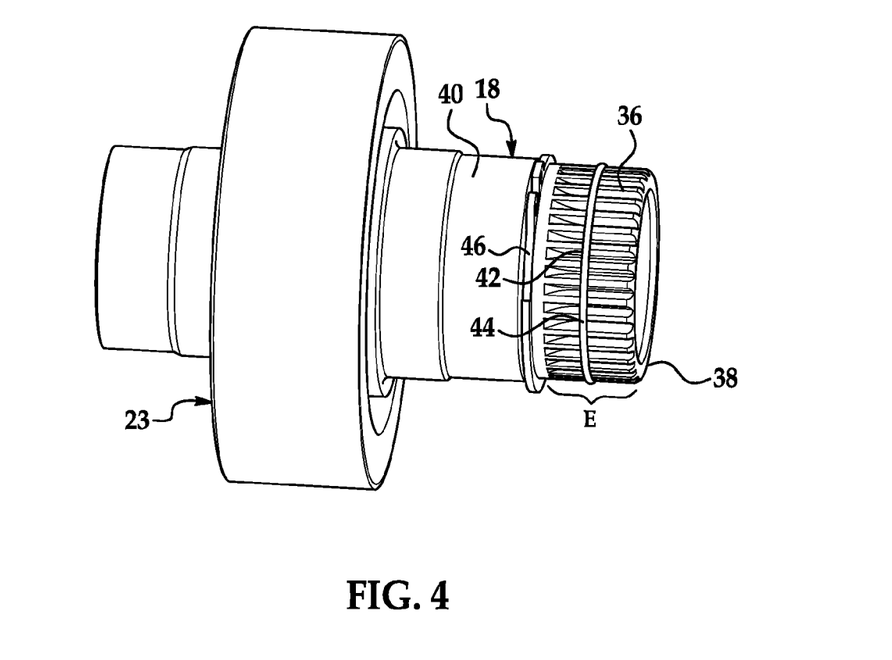
FIG. 4 is a side view of an embodiment of a second shaft used with the vehicle PTU disconnect assembly of FIG. 2.
Figure 5:
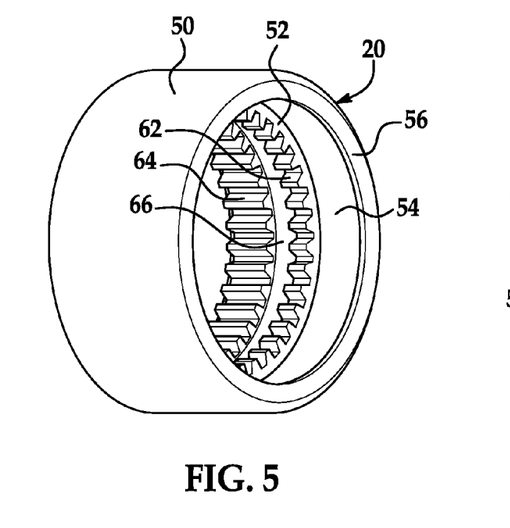
FIG. 5 is a perspective view of an embodiment of a collar assembly used with the vehicle PTU disconnect assembly of FIG. 2.
Figure 6:
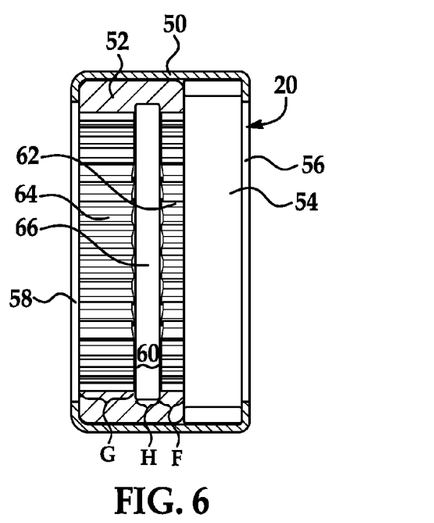
FIG. 6 is a sectioned view of the collar assembly of FIG. 5.

The second shaft 18 is selectively interconnected to, and thus selectively driven by, the first shaft 16 via the collar assembly 20. Referring to FIGS. 2 and 4, in this embodiment the second shaft 18 is a hollow metal tube that radially overlaps the first shaft 16 at a radially outward location of the first shaft. In this sense, the second shaft 18 is a sleeve shaft that is situated around and telescopes over the first shaft 16. The helical gear 23 of the PTU 12 is carried by the second shaft 18; although depicted schematically in FIG. 4, skilled artisans will appreciate that the helical gear 23 would typically have a set of teeth that mesh with a set of teeth of a pinion or output gear. When interconnected, the second shaft 18 rotates about the axis A. The second shaft 18 has a set of splines 36 (referred to as the third set of splines in the assembly) near a terminal end 38 and at an exterior surface 40. In the embodiment presented by the figures, the third set of splines 36 is arranged circumferentially continuously around the second shaft 18, and spans axially from the terminal end 38 for a fourth axial length E. The fourth axial length E can be greater than both the first and second axial lengths B, C. Between its first and second ends, the third set of splines 36 defines a circumferential groove 42 (FIGS. 4 and 10) for receiving a stop structure 44 which may include, but is not limited to, a circlip. In use, the stop structure 44 prevents excess movement of the collar assembly 20 when the collar assembly is being shifted. The stop structure 44 can have other designs, constructions, and components in other embodiments. Furthermore, a retainer such as a retention ring 46 can be carried in a groove defined in the exterior surface 40 and near an end of the third set of splines 36. When provided, the retention ring 46 seats a primary spring 48 and precludes axial movement of the primary spring. The primary spring 48 is depicted schematically in the figures. It can be a helical spring or another type of spring. In general, the primary spring 48 biases the collar assembly 20 toward the cam assembly 22. The primary spring 48 is situated around the second shaft 18 and at a radially outward location of the second shaft, and is situated axially next to the collar assembly 20—its arrangement is perhaps shown best in FIG. 10.

The collar assembly 20 shifts to connect and disconnect the first and second shafts 16, 18. The collar assembly 20 can have different designs, constructions, and components for achieving this functionality. Referring to FIGS. 2, 5, 6, and 10, in this embodiment the collar assembly 20 overlaps the first and second shafts 16, 18 at a radially outward location of the shafts. Here, the collar assembly 20 has a multi-piece construction that includes a cage 50, a collar 52, and a secondary spring 54. The cage 50 serves as an annular housing for holding the collar 52 and secondary spring 54 at its interior. A first annular flange 56 is located at one axial end of the cage 50, and a second annular flange 58 is located at its other axial end. The collar 52 also has an annular shape and sits inside of the cage 50. At an interior surface 60, the collar 52 has a first set of splines 62 (referred to as the fourth set of splines in the assembly), a second set of splines 64 (referred to as the fifth set of splines in the assembly), and a non-splined section 66 (referred to as the second non-splined section in the assembly) separating the fourth and fifth sets of splines 62, 64.

In the embodiment depicted, the fourth set of splines 62 is arranged circumferentially continuously around the collar 52 and projects radially inboard relative to the interior surface 60. The fourth set of splines 62 has a fifth axial length F that can be substantially equal to the first and second axial lengths B and C of the first shaft 16, though need not be. Like the fourth set, the fifth set of splines 64 is arranged circumferentially continuously around the collar 52 and projects radially inboard relative to the interior surface 60. The fifth set of splines 64 has a sixth axial length G that can be substantially greater than the second axial length C of the second set of splines 30. The second non-splined section 66 spans axially between the fourth and fifth sets of splines 62, 64. With respect to its neighboring sets of splines, the second non-splined section 66 presents a circumferential space that lacks formations and is set radially outboard of the sets of splines. The second non-splined section 66 has a seventh axial length H that can be greater than the second axial length C of the second set of splines 30. Together, the fourth and fifth sets of splines 62, 64 and the second non-splined section 66 constitute a split-spline.

The secondary spring 54 can have an annular shape and sits inside of the cage 50. The secondary spring 54 is depicted schematically in the figures. It can be a helical spring or another type of spring. The secondary spring 54 is provided in order to accommodate a condition known as torque-lock in which the splines of the first and second shafts 16, 18 and collar 52 are mated together and torque is being transmitted between them; in this condition, exertions between the mated splines preclude movement of the collar 52. Accommodation via the secondary spring 54 is detailed below.

Figure 7A:
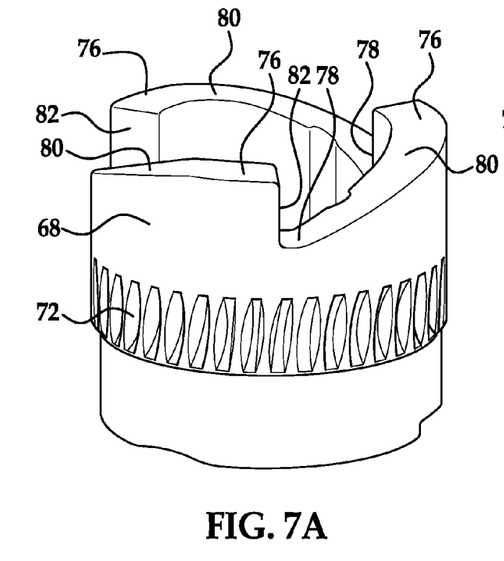
FIG. 7A is a perspective view of an embodiment of a rotary cam.
Figure 7B:
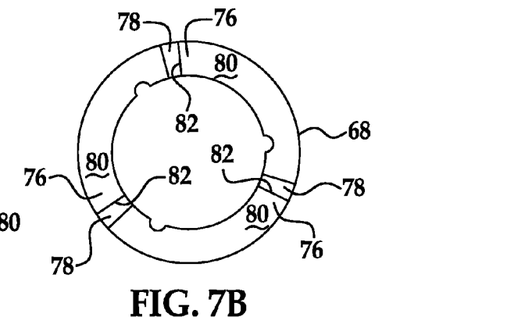
FIG. 7B is a top view of the rotary cam of FIG. 7A.
Figure 7C:
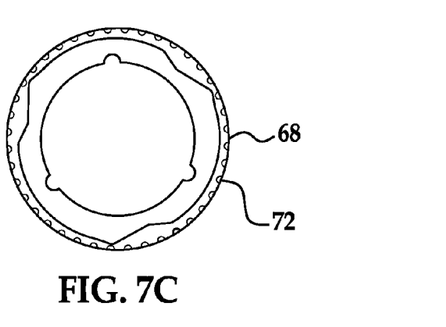
FIG. 7C is a bottom view of the rotary cam of FIG. 7A.
Figure 8A:
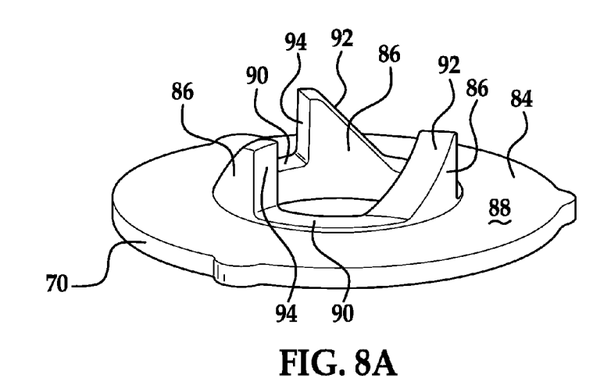
FIG. 8A is a perspective view of an embodiment of a cam follower.
Figure 8B:
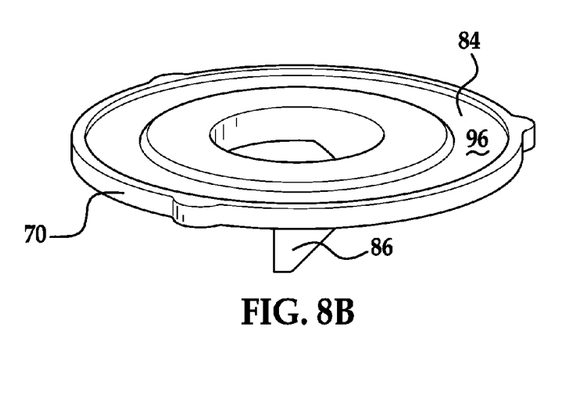
FIG. 8B is another perspective view of the cam follower of FIG. 8A.
Figure 8C:
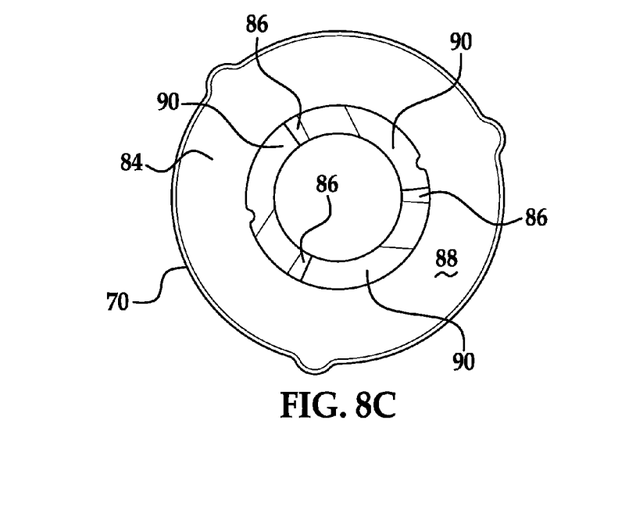
FIG. 8C is a top view of the cam follower of FIG. 8A.
Figure 8D:
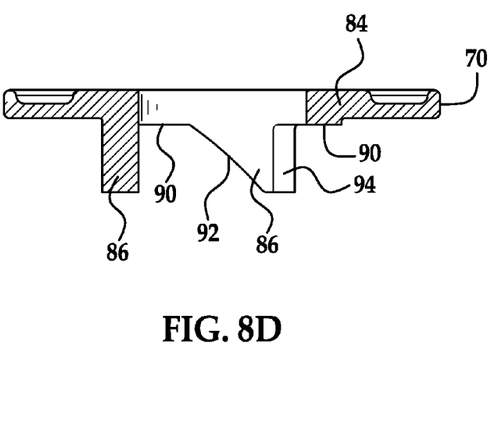
FIG. 8D is a sectioned view of the cam follower of FIG. 8A.
Figure 9A:
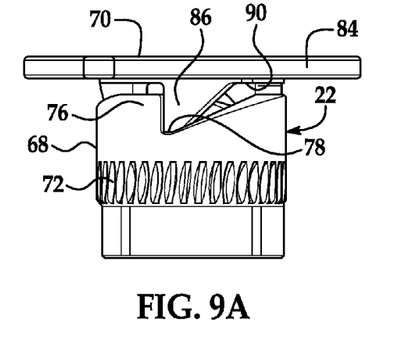
FIG. 9A shows an embodiment of a cam assembly when the vehicle PTU disconnect assembly of FIG. 2 is in a connected state.
Figure 9B:
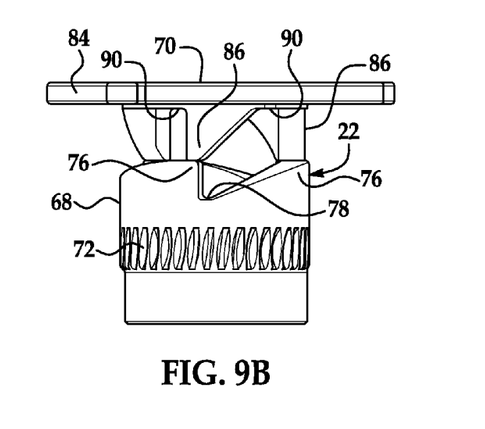
FIG. 9B shows the cam assembly of FIG. 9A when the vehicle PTU disconnect assembly of FIG. 2 is in a disconnected state.
Figure 10:
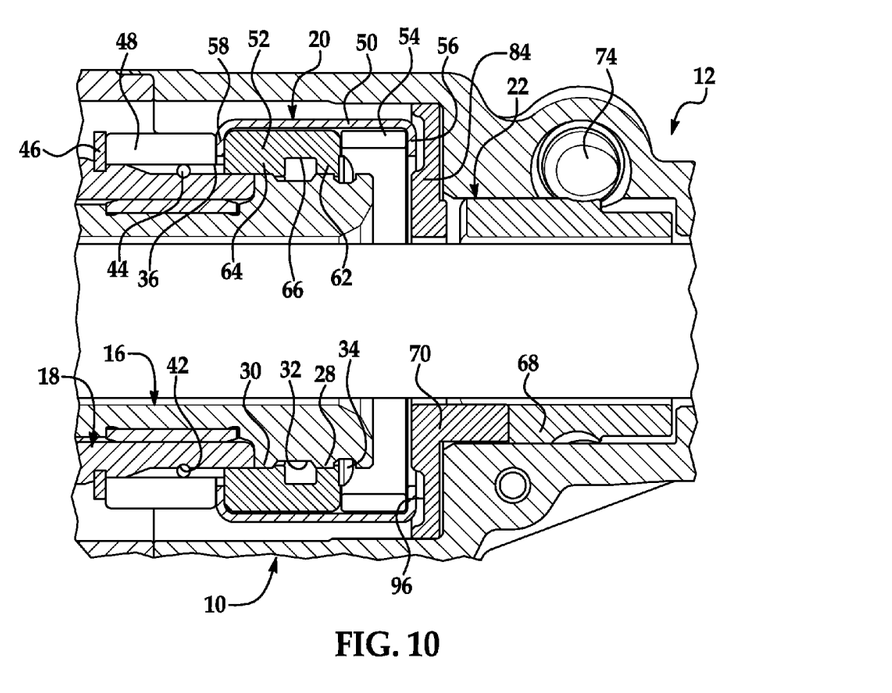
FIG. 10 is an enlarged sectioned view of the vehicle PTU disconnect assembly of FIG. 2.

Upon activation, the cam assembly 22 causes the collar assembly 20 to shift its position and therefore connect and disconnect the first and second shafts 16, 18. The cam assembly 22 can have different designs, constructions, and components for achieving this functionality. Referring to FIGS. 2, 7A-7C, 8A-8D, 9A-9B, and 10, in this embodiment the cam assembly 22 is situated near the terminal end 24 of the first shaft 16 and at the first annular flange 56 of the cage 50. Here, the cam assembly 22 has a multi-piece construction that includes a rotary cam 68 and a cam follower 70. Referring now particularly to FIGS. 7A-7C, the rotary cam 68 has a cylindrical body with a series of teeth 72 at its exterior surface for meshing with a worm gear 74 (FIGS. 2 and 10). The rotary cam 68 has a profiled terminal end for interacting with the cam follower 70. Three lobes 76 are separated by three recesses 78; other quantities of lobes and recesses are possible. The lobes 76 and recesses 78 are formed by repeating ramped surfaces 80 and steeped surfaces 82.

Referring now to FIGS. 8A-8D, the cam follower 70 has a disk-like shape with a rim 84 and with axially projecting lobes 86 on a first side 88 for interacting with the rotary cam 68. Three lobes 86 are separated by three recesses 90, although, as before, other quantities of lobes and recesses are possible. The lobes 86 and recesses 90 are formed by repeating ramped surfaces 92 and steeped surfaces 94. In this embodiment, a second side 96 of the rim 84 directly engages the first annular flange 56 of the cage 50 in operation via surface-to-surface abutment, as perhaps illustrated best by FIG. 10. The second side 96 can be grooved as shown for this purpose.

The lobed and recessed construction of the cam follower 70 is complementary to that of the rotary cam 68 so that the cam follower and rotary cam fit together and cooperate to cause linear reciprocation of the cam follower as the rotary cam is rotated. This is perhaps best illustrated in FIGS. 9A and 9B. In FIG. 9A, the lobes and recesses 76, 78, 86, 90 of the rotary cam 68 and cam follower 70 are meshed together, and the rotary cam and cam follower are in a retracted position relative to each other. In FIG. 9B, in contrast, the lobes and recesses 76, 78, 86, 90 are unmeshed and the rotary cam 68 and cam follower 70 are in an extended position relative to each other. From the retracted to the extended position, the rotary cam 68 is rotated by the worm gear 74 (FIGS. 2 and 10) in a single direction and the ramped surfaces 80, 92 slide against each other as the cam follower 70 is pushed gradually away from the rotating rotary cam 68. In this embodiment, the rotary cam 68 only rotates and does not move in a linear direction; it is the cam follower 70 that moves in the linear direction. When the ramped surfaces 80, 92 are peak-to-peak, as depicted in FIG. 9B, the cam follower 70 is at a fully extended position with respect to the rotary cam 68. Just beyond peak-to-peak, the steeped surfaces 82, 94 come into confrontation as opposing lobes and recesses 76, 78, 86, 90 again come meshing together, as depicted in FIG. 9A. Because the steeped surfaces 82, 94 are sloped to a much greater degree than the ramped surfaces 80, 92 relative to an axis of the rotary cam 68 (indeed, the steeped surfaces are substantially in-line with the axis), the cam follower 70 is brought to the fully retracted position much quicker than it is brought to the fully extended position.

Figure 11:
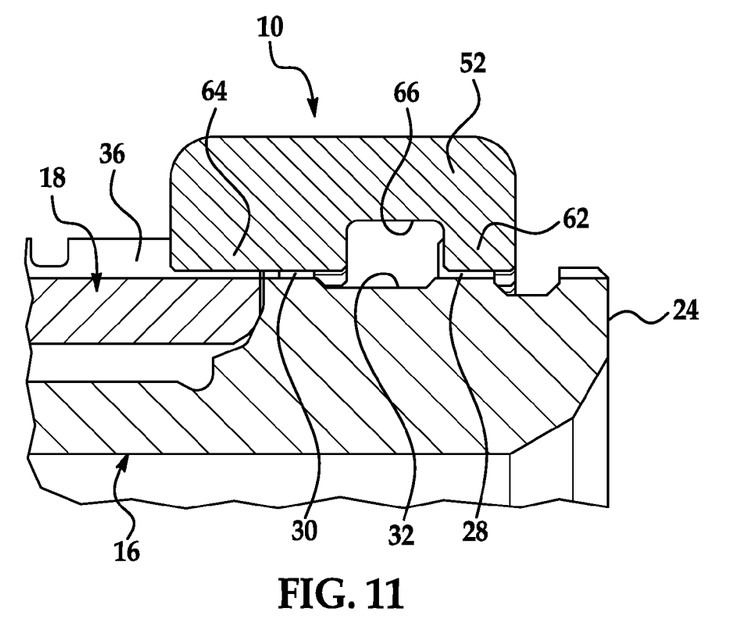
FIG. 11 is an enlarged view of the vehicle PTU disconnect assembly of FIG. 2 in a first shifted position.
Figure 12:
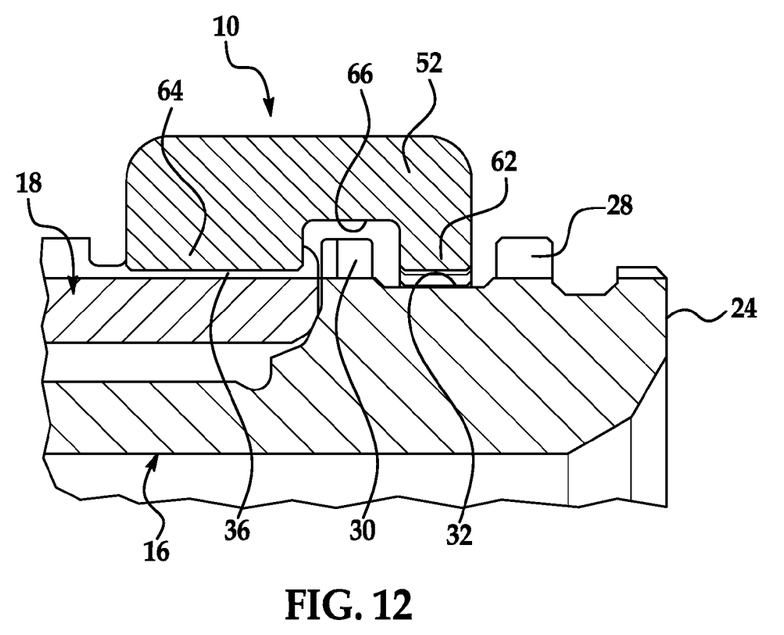
FIG. 12 is an enlarged view of the vehicle PTU disconnect assembly of FIG. 2 in a second shifted position.

In operation, the PTU disconnect assembly 10 disconnects the first and second shafts 16, 18 to preclude transmitted rotation from the first shaft to the second shaft, and re-connects the first and second shafts to permit transmitted rotation therebetween. The disconnect/re-connect functionality can be managed by an electronic control unit (ECU). Reference is now primarily being made to FIGS. 10-12, in which FIGS. 10 and 11 show the first and second shafts 16, 18 in a connected state for transmitting rotation between the two via the collar assembly 20, and FIG. 12 shows the shafts in a disconnected state where the first shaft does not transmit rotation to the second shaft.

In the connected state, the cam assembly 22 is in its fully retracted position and the sets of splines of the first and second shafts 16, 18 and collar assembly 20 are mated together. In particular, the first set of splines 28 of the first shaft 16 is mated with the fourth set of splines 62 of the collar 52, and the second set of splines 30 of the first shaft and the third set of splines 36 of the second shaft 18 are mated with the fifth set of splines 64 of the collar. With this mating, the collar assembly 20 is in its first shifted position. Here, the collar 52 and its sets of splines 62, 64 join the first and second shafts 16, 18 together for co-rotation.

When instructed, an actuator motor 98 (FIG. 1) turns the worm gear 74 (FIGS. 2 and 10) to cause the rotary cam 68 to rotate. The cam follower 70 moves linearly and axially away from the rotary cam 68 and toward the collar assembly 20. The rim 84 engages the cage 50 and urges shifting movement of the collar assembly 20 against the bias of the primary spring 48. The primary spring 48 yields and is thereby compressed. The collar 52 in turn shifts linearly and axially as its sets of splines 62, 64 slide out of mating with the sets of splines 28, 30 of the first shaft 16. The first and second shafts 16, 18 do not move linearly.

As set previously, the collar 52 may be temporarily precluded from being shifted due to the torque-lock condition. The second spring 54 accommodates the transitory preclusion, and linear movement of the cam follower 70 and cage 50 is still permitted. Referring particularly to FIG. 10, the secondary spring 54 yields to forces exerted on it via the cam follower 70 and cage 50, and the secondary spring in turn compresses. The cage 50 hence moves toward the retention ring 46 in FIG. 10 and causes compression of the primary spring 48 as the primary spring also yields to forces exerted on it. The spring constant (k) of the secondary spring 54 may have a value that is less than the spring constant (k) of the primary spring 48 so that the secondary spring yields more easily than the primary spring. Since the collar 52 is temporarily immobile, the cage 50 and cam follower 70 move relative to the collar. In this way, the cage 50 and cam follower 70 are not also precluded from moving due to the torque-lock condition. Once the torque-lock condition ceases—which may occur in the midst of cage and cam follower 50, 70 movement relative to the collar 52—the collar 52 might be shifted at cessation via the secondary spring 54. Further, the stop structure 44 prevents the collar 52 from shifting farther than it should by blocking movement of the collar via abutment between the two.

When completely unmated as depicted in FIG. 12, the fourth set of splines 62 of the collar 52 is situated in the first non-splined section 32 of the first shaft 16, and the second set of splines 30 of the first shaft is situated in the second non-splined section 66 of the collar. The third set of splines 36 of the second shaft 18, however, remain mated with the fifth set of splines 64 of the collar 52. With this arrangement, the first and second shafts 16, 18 are in their disconnected state and the first shaft rotates independently of the second shaft and rotation is not transmitted therebetween. The cam assembly 22 is in its fully extended position and the collar assembly 20 is in its second shifted position. To re-connect, the rotary cam 68 is caused to rotate a bit more beyond peak-to-peak so that the steeped surfaces 83, 94 come into confrontation, as previously described. The cam assembly 22 then goes back to its fully retracted position and the spring 48 urges the collar assembly 20 to its first shifted position. The dampener 34 may serve as an index or stop as the collar 52 moves to the first shifted position. The dampener 34 deadens and dissipates any noise, vibration, or harshness that may otherwise result when the collar assembly 20 is urged to its first shifted position.

The split-splines of the first shaft 16 and the collar 52 interact with each other to minimize the disconnect and re-connect shift distances in the axial direction with respect to the axis A. This can reduce the amount of time needed to disconnect the first and second shafts 16, 18 and to then re-connect them, resulting in quicker performance as is sometimes called for in a vehicle's PTU. The minimized shift distances also can reduce the amount of force required to carry out shifting. Moreover, the minimized shift distances means that other components of the PTU 12 can have a reduced overall size, therefore satisfying what-are-oftentimes inflexible packaging demands in these types of applications. For instance, since the cam follower 70 need not travel as far, its lobes and axial length can hence be shortened.

While described with reference to the figures, the PTU disconnect assembly can be designed and constructed in different ways than depicted. For example, the cam assembly need not be provided, in which case another component or assembly could be employed to cause the collar assembly to shift its position; some specific examples could include ball cam mechanisms, pressurized pistons, and/or shift forks. The cam assembly and other components/assemblies utilized to shift the position of the collar assembly constitute actuator assemblies. As another example, the collar assembly could include only the collar, and need not include the cage and the spring. Moreover, the term splines is used broadly to also encompass teeth and other similar structures that are capable of mating and unmating to transmit rotation.

While the forms of the disclosure constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. A vehicle power transfer unit (PTU) disconnect assembly, comprising:
    a first shaft having a first set of splines, a second set of splines, and a first non-splined section separating said first and second sets of splines;
    a second shaft having a third set of splines; and
    a collar having a fourth set of splines, a fifth set of splines, and a second non-splined section separating said fourth and fifth sets of splines;
    wherein, in a first shifted position of said collar, said first set of splines of said first shaft are mated with said fourth set of splines of said collar, and said second set of splines of said first shaft and said third set of splines of said second shaft are mated with said fifth set of splines of said collar, in the first shifted position the vehicle PTU disconnect assembly is in a connected state and rotation is transmitted from said first shaft to said second shaft, and wherein, in a second shifted position of said collar, said fourth set of splines of said collar is situated at said first non-splined section of said first shaft, and said second set of splines of said first shaft is situated at said second non-splined section of said collar, in the second shifted position the vehicle PTU disconnect assembly is in a disconnected state and rotation is not transmitted from said first shaft to said second shaft; and
    a dampener located on said first shaft and coming into abutment with said collar when said collar is in the first shifted position.

2. The vehicle power transfer unit (PTU) disconnect assembly of claim 1, wherein said collar overlaps said first and second shafts at least at sections of their axial extents and at a radially outward location of said first and second shafts.

3. The vehicle power transfer unit (PTU) disconnect assembly of claim 1, further comprising a collar assembly including said collar, a cage, and a secondary spring, said collar and said secondary spring being held in said cage, and further comprising an actuator assembly arranged to engage the cage and move the collar assembly, said cage being engaged by the actuator assembly when said collar is shifted from said first shifted position to said second shifted position.

4. The vehicle power transfer unit (PTU) disconnect assembly of claim 3, wherein, if said collar experiences a torque-lock condition when said collar is attempting to shift in the direction of the second shifted position, said secondary spring yields and is compressed and said cage moves relative to said collar.

5. The vehicle power transfer unit (PTU) disconnect assembly of claim 4, further comprising a primary spring situated around said second shaft and biasing said collar to the first shifted position, said secondary spring having a spring constant value that is less than a spring constant value of said primary spring.

6. The vehicle power transfer unit (PTU) disconnect assembly of claim 1, further comprising a stop structure located at said second shaft, said stop structure precluding movement of said collar beyond the second shifted position.

7. The vehicle power transfer unit (PTU) disconnect assembly of claim 1, further comprising a cam assembly that shifts said collar from the first shifted position to the second shifted position, said cam assembly including a rotary cam and a cam follower, wherein, when shifting said collar from the first shifted position to the second shifted position, rotation of said rotary cam causes linear movement of said cam follower, and linear movement of said cam follower causes shifting of said collar.

8. The vehicle power transfer unit (PTU) disconnect assembly of claim 7, wherein said rotary cam has at least one lobe and at least one recess, and said cam follower has at least one complementary lobe and at least one complementary recess.

9. The vehicle power transfer unit (PTU) disconnect assembly of claim 1, further comprising a primary spring situated around said second shaft at a radially outward location of said second shaft, said primary spring biasing said collar to the first shifted position.

10. The vehicle power transfer unit (PTU) disconnect assembly of claim 1, wherein said second set of splines of said first shaft has a first axial length (C), said first non-splined section of said first shaft has a second axial length (D), said fourth set of splines of said collar has a third axial length (F), said second non-splined section has a fourth axial length (H), said fourth axial length (H) is greater than said first axial length (C), and said second axial length (D) is greater than said third axial length (F).

11. A vehicle power transfer unit (PTU) comprising the vehicle PTU disconnect assembly of claim 1.

12. A vehicle power transfer unit (PTU) disconnect assembly, comprising:
a first shaft having a first split-spline at an exterior surface of said first shaft;
a second shaft situated at least partly around said first shaft, said second shaft having a set of splines at an exterior surface of said second shaft, said second shaft carrying a helical gear at a location spaced away from said set of splines;
a collar assembly situated partly around said first shaft and partly around said second shaft, said collar assembly including a cage, a collar, and a secondary spring, said collar and said secondary spring held by said cage, said collar having a second split-spline at an interior surface of said collar; and
an actuator assembly engaging said collar assembly to move said collar assembly from a first shifted position to a second shifted position, wherein, in the first shifted position, said first split-spline is mated with said second split-spline, and said second split-spline is mated with said set of splines, and wherein, in the second shifted position, said first split-spline is unmated with said second split-spline, wherein, if a torque-lock condition is being experienced when said actuator assembly engages said collar assembly, said secondary spring yields and said cage moves relative to said collar; and
a stop structure carried by said second shaft, said stop structure precluding movement of said collar beyond the second shifted position.

13. The vehicle power transfer unit (PTU) disconnect assembly of claim 12, wherein said actuator assembly is a cam assembly that includes a rotary cam and a cam follower, rotation of said rotary cam causes linear movement of said cam follower, and said cam follower engages said collar assembly to move said collar assembly from the first shifted position to the second shifted position.

14. The vehicle power transfer unit (PTU) disconnect assembly of claim 12, further comprising a primary spring situated around said second shaft and spaced axially from said collar assembly, said primary spring biasing said collar assembly to the first shifted position.

15. The vehicle power transfer unit (PTU) disconnect assembly of claim 14, wherein a spring constant value of said secondary spring is less than a spring constant value of said primary spring.

16. The vehicle power transfer unit (PTU) disconnect assembly of claim 12, further comprising a dampener located on said first shaft and coming into abutment with said collar when said collar is in the first shifted position.

17. A vehicle power transfer unit (PTU) disconnect assembly, comprising:
a first shaft having a first split-spline at an exterior surface of said first shaft;
a second shaft having a set of splines at an exterior surface of said second shaft;
a collar having a second split-spline at an interior surface of said collar; and
a cam assembly including a rotary cam and a cam follower, rotation of said rotary cam causes linear movement of said cam follower, said cam follower engaging said collar to move said collar from a first shifted position to a second shifted position, wherein, in the first shifted position, said first split-spline is mated with said second split-spline, and said second split-spline is mated with said set of splines, and wherein, in the second shifted position, said first split-spline is unmated with said second split-spline; and
a dampener located on said first shaft and coming into abutment with said collar when said collar is in the first shifted position.

18. The vehicle power transfer unit (PTU) disconnect assembly of claim 17, further comprising a primary spring biasing said collar to the first shifted position.

19. The vehicle power transfer unit (PTU) disconnect assembly of claim 18, further comprising a collar assembly including said collar, a cage, and a secondary spring, said collar and said secondary spring being held in said cage, said cage being engaged by said cam follower when said collar is shifted from said first shifted position to said second shifted position, wherein, if said collar experiences a torque-lock condition when said collar is attempting to shift in the direction of the second shifted position, said spring yields and said cage moves with respect to said collar.

20. The vehicle power transfer unit (PTU) disconnect assembly of claim 19, wherein a spring constant value of said secondary spring is less than a spring constant value of said primary spring.

21. The vehicle power transfer unit (PTU) disconnect assembly of claim 17, further comprising a stop structure carried by said second shaft, said stop structure precluding movement of said collar beyond the second shifted position.

* * * * *